United States Patent [19]

Moorman et al.

[11] 3,787,661

[45] Jan. 22, 1974

[54] MAGNETICALLY ENCODED CARD READER AND/OR WRITER

[75] Inventors: Charles J. Moorman, Cincinnati; Martin R. Meyer, Mt. Healthy; Frederick A. Reuter, Cincinnati, all of Ohio

[73] Assignee: The Mosler Safe Company, Hamilton, Ohio

[22] Filed: May 30, 1972

[21] Appl. No.: 258,017

[52] U.S. Cl. ....... 235/61.11 D, 235/61.11 R, 271/8, 340/149 A, 340/174.1 F

[51] Int. Cl. .... G06k 7/08, G06k 13/08, G11b 5/48, B65h 29/00

[58] Field of Search ... 271/8; 235/61.11 R, 61.11 D, 235/61.12 M, 61.7 B; 340/149 A, 174.1 C, 174.1 F; 200/46; 194/4 G

[56] References Cited

UNITED STATES PATENTS

| | | | |
|---|---|---|---|
| 3,624,360 | 11/1971 | Collier | 235/61.11 R |
| 3,562,495 | 2/1971 | Grippi | 235/61.11 R |
| 3,705,396 | 12/1972 | Nagaki | 340/174.1 C |
| 3,349,369 | 10/1967 | Jensen | 235/61.11 D |
| 3,373,248 | 3/1968 | Baybick | 340/174.1 F |
| 3,310,791 | 3/1967 | Fischer | 340/174.1 F |
| 3,514,770 | 5/1970 | Parken | 235/61.11 D |
| 3,646,325 | 2/1972 | George | 235/61.11 R |
| 3,588,379 | 6/1971 | Young | 235/61.11 R |
| 3,629,556 | 12/1971 | Orzechowski | 235/61.11 B |

*Primary Examiner*—Daryl W. Cook
*Assistant Examiner*—Robert M. Kilgore
*Attorney, Agent, or Firm*—James S. Hight et al.

[57] ABSTRACT

A reader and/or writer for magnetically encoded cards including a frame structure, a guide assembly for guidably supporting a card manually inserted into the reader, a transducer for reading and/or writing the magnetically encoded data on the inserted card, a pair of rolls underlying an inserted card and displaced laterally of, but symmetrical to, the transducer for supporting the card in the region thereof proximate the transducer, and a motor to drive one of the support rolls for returning the card to the user and effecting reading and/or writing thereof by the transducer.

1 Claim, 7 Drawing Figures

MAGNETICALLY ENCODED CARD READER AND/OR WRITER

This invention relates to card readers and/or writers, and more particularly card readers and/or writers of the type designed to read and/or write information magnetically encoded on a card.

Devices for reading and/or writing information magnetically encoded on a card, hereinafter referred to as "readers," are utilized in a variety of different environments. For example, such readers are found in cash and merchandise dispensing systems wherein insertion of a valid encoded credit card effects the dispensing operation, as well as in access control systems in which a properly encoded card is a prerequisite to entry through a normally locked door, gate or the like. Card readers, whether utilized in a dispensing system or an access control system, must be reliable and maintenance-free. Additionally, such readers are desirably compact and inexpensive.

It is an object of this invention to provide an improved reader which is characterized by its high reliability, low maintenance, compactness and low cost. This objective has been accomplished by providing a reader which is, from both a structural and operational standpoint, extremely simple. The reader, in accordance with a preferred embodiment, includes a slotted housing through which a magnetically encoded card is manually inserted by the user. Sandwiching the inserted card on one side is a transducer and on the other side a pair of support rolls symmetrically disposed with respect to, but laterally displaced from, the transducer. One of the support rolls, and only one, is driven for simultaneously returning the inserted card to the user and effecting reading thereof by the transducer. The pair of rolls, by being laterally displaced from the transducer, can be spaced in close proximity to each other, thereby providing maximum support for the card in the region of the transducer. Since only one of the rolls of the pair is driven, the drive means for returning the card and effecting reading thereof is minimized.

In accordance with a further feature of this invention, the reader, in a preferred form, is provided with a simplified transducer mounting assembly which permits rectilinear and angular adjustment of the transducer with respect to the magnetically encoded data on the card. The mounting assembly includes a set of three triangularly positioned screws selectively adjustably threadable into the transducer housing, and a jam screw, the end of which abuts the transducer housing. The adjusting screws slidably fit in bores provided in the side wall of the reader frame, while the jam screw threads into the reader wall. When the jam screw is advanced to the extent permitted by the adjustment screws, the rectilinear and angular position of the transducer is set. By selectively advancing or withdrawing one or more of the adjusting screws with respect to the transducer housing, the rectilinear and angular position of the transducer can be modified.

These and other advantages and features of the invention will become more readily apparent from a detailed description of a preferred embodiment of the invention taken in conjunction with the drawings in which.

Figures 1, 2, 3, 4, 5, 6, 7:
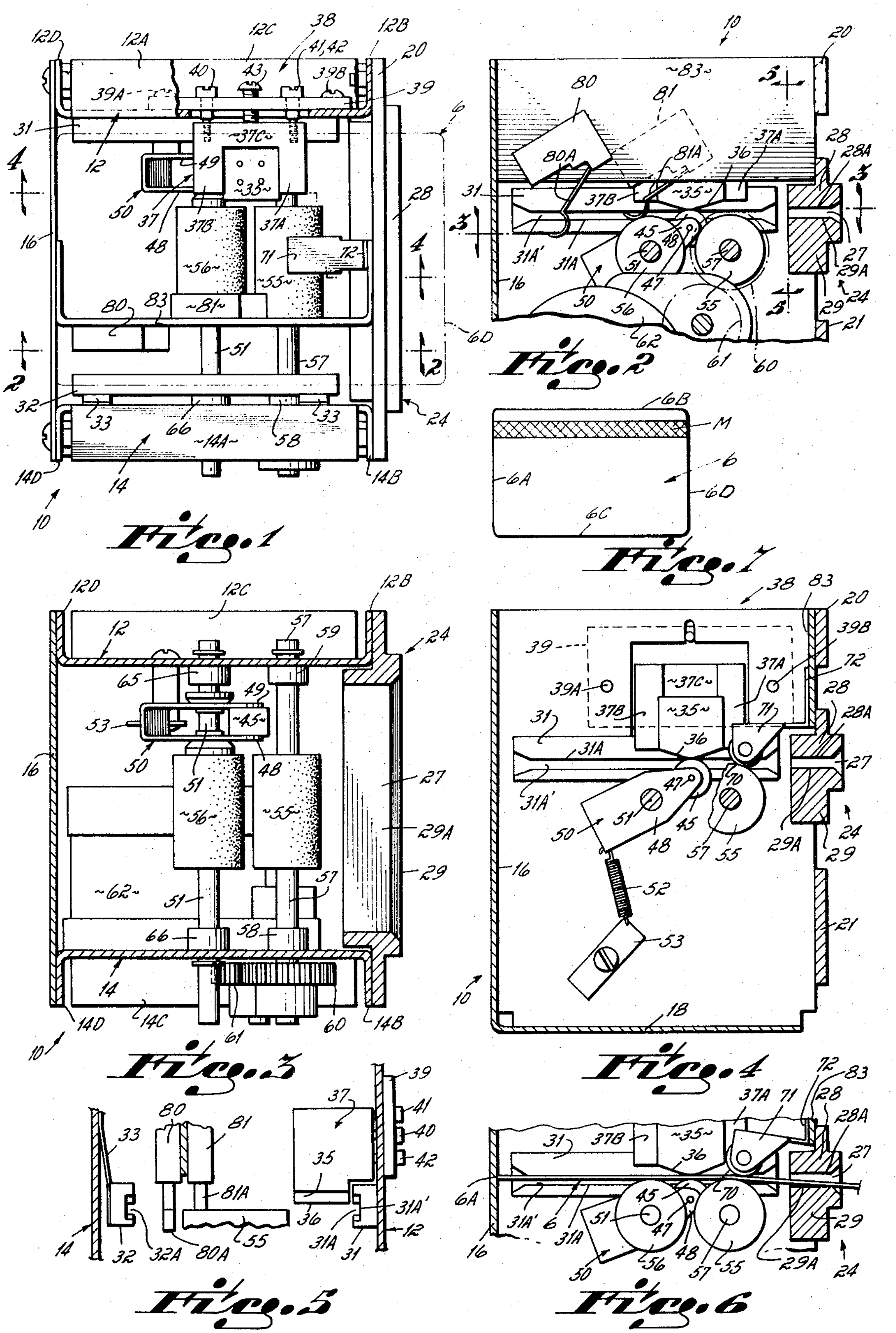
FIG. 1 is a plan view of the reader with a portion thereof cut away to show the transducer adjusting assembly.
FIG. 2 is a cross-sectional view taken along line 2—2 of FIG. 1.
FIG. 3 is a cross-sectional view taken along line 3—3 of FIG. 2.
FIG. 4 is a cross-sectional view taken along line 4—4 of FIG. 1.
FIG. 5 is a cross-sectional view taken along line 5—5 of FIG. 2.
FIG. 6 is a fragmentary cross-sectional view similar to a portion of FIG. 4 and illustrating a card fully inserted therein.
FIG. 7 is a plan view of a magnetically encoded card useful with the reader of this invention.

A preferred form of card 6 useful with the reader of this invention typically includes a generally rectangular plastic sheet approximately 30 mils thick. The card has a leading edge 6A, opposite side edges 6B and 6C, and a trailing edge 6D. Located on the upper surface of the card is an elongated layer or stripe of magnetic recording material M, for example, ferric oxide, which can be appropriately magnetically encoded with identification indicia, such as an employee identification number, account number, or the like. The card 6 preferably is sized to approximate a conventional credit card, e.g., 2 inches by 3 ½ inches.

The card reader of this invention includes a combination housing and frame structure 10 for enclosing and mounting the various operating components of the reader in the desired physical relationship to each other. The housing and frame 10 has opposite sheet metal side walls 12 and 14 which are parallel to each other and vertically disposed. The marginal portions 12A, 12B, 12C, 12D and 14A, 14B, 14C and 14D of side walls 12 and 14, respectively, are angled outwardly to form mounting flanges. A vertical rear wall 16 and horizontal bottom 18, which are of sheet metal and integral, also form housing and frame sections. Opposite side edges of the rear wall 16 are fixedly secured by suitable fasteners to the flanges 12D and 14D of the side walls 12 and 14, while opposite side edges of the bottom 18 are fixedly secured to the bottom flanges 12C and 14C of the side walls 12 and 14. Upper and lower horizontal plates 20 and 21 secured at their opposite ends to side flanges 12B and 14B of side walls 12 and 14 complete the housing and frame structure.

A card guide assembly 24 fixed to the housing and frame 10 is provided to guide and support the rectangular card 6 inserted horizontally into the reader via an opening 27 in the front thereof. The card guide assembly 24 includes horizontally disposed upper and lower elongated members 28 and 29 which are secured at their opposite ends to the flanges 12B and 14B of side walls 12 and 14. The members 28 and 29 have confronting spaced apart horizontal surfaces 28A and 29A which collectively define the mouth or opening 27 in the front of the reader into which the leading edge 6A of the card 6 is inserted. To guidably position the card 6 once inserted into the reader via the opening 27, lateral guide blocks 31 and 32 are provided. Blocks 31 and 32 have confronting horizontal slots 31A and 32A which slidably engage opposite side edges 6B and 6C of an inserted card. The guide block 31 is fixedly secured to the inner surface of side wall 12 with the vertical surface 31A' of the slot 31A providing a locating or reference surface for the edge 6B of the inserted card. Guide block 32 is mounted to the inner surface of frame side wall 14 via a pair of leaf-springs 33 which function to resiliently urge the guide block 32 toward guide block 31, with the result that card edge 6B of an inserted card is urged against reference surface 31A'. The guide blocks 31 and 32 are preferably fabricated of a smooth, plastic material to facilitate low friction sliding engagement with the edges 6B and 6C of the card 6 upon insertion into the reader. The extent to which the card 6 can be inserted into the reader is limited by abutment of the leading edge 6A of the card 6 against the inner vertical surface of rear wall 16.

Located within the reader is a card-reading and/or card-writing transducer or head 35 having a convex bottom surface 36 for operatively transducing information magnetically encoded on stripe M of a card 6 as it passes in registry therewith upon expulsion from the reader in a manner to be described. The transducing head 35 is mounted in operative relationship to the magnetic stripe M of card 6 properly positioned in the reader by an adjustable mounting assembly 38 which includes a C-shaped block 37 having spaced vertical front and rear walls 37A and 37B interconnected by a vertical side wall 37C. Walls 37A, 37B and 37C of the mounting block 37 surround the transducer on three sides thereof, the transducer being held in position with respect to the block 37 by suitable fasteners (not shown). The head mounting assembly 38 also includes a plate 39 which is secured to the outside surface of the frame wall 12 by spaced fasteners 39A and 39B which pass through slots in the plate 39 and threadedly engage the wall 12. Preferably the apertures in the plate 39 through which the fasteners 39A and 39B pass are in the form of elongated vertical slots to permit vertical adjustment of the plate 39, and hence the transducer 35, with respect to the side wall 12.

To laterally position the block 37, and hence the transducer 35 rigidly fixed thereto, three adjusting screws 40, 41 and 42 are provided along with a jam screw 43. Adjusting screws 40, 41 and 42 threadedly engage, at their ends, the transducer mounting blocks 37. The intermediate portions of adjusting screws 40, 41 and 42 are not threaded and are slidably positioned in unthreaded bores formed in the mounting plate 39 at locations which approximate the vertices of a triangle. The jam screw 43 is threadedly engaged in a suitable threaded hole formed in the plate 39. When the jam screw 43 is screwed into the plate 39, the end thereof passes through an oversized hole in frame wall 12 and abuts the wall 37C of the transducer mounting block 37, urging the block inwardly. Inward motion of the block 37 under the action of the jaw screw 43 is limited by the extent to which the adjusting screws 40, 41 and 42 are screwed into their respective threaded bores formed in block 37.

The block 37 can be adjustably positioned toward the side wall 14 by retracting the screws 40, 41 and 42 from the block 37, while the block can be advanced toward the side wall 12 by advancing the adjusting screws 40, 41 and 42. The block 37 can be rotated about a vertical axis in the clockwise direction as viewed in FIG. 1 by advancing screw 40 and withdrawing screws 41 and 42. Similarly, counterclockwise rotation can be achieved by advancing screws 41 and 42 and retracting screw 40. Rotation of the transducer head mounting block 37 about a horizontal axis parallel to wall 12 can be produced by differentially advancing and/or withdrawing upper and lower adjusting screws 41 and 42. Clockwise motion of the block 37, as viewed in FIG. 5, is accomplished by advancing the upper adjusting screw 41 and retracting the lower adjusting screw 42, while counterclockwise motion is obtained by retracting the upper adjusting screw 41 while advancing the lower screw 42.

A biasing roll 45 mounted for rotation about a horizontal axis perpendicular to side walls 12 and 14 is provided for urging, from below the inserted card 6, the magnetic stripe M into contact with the convex surface 36 of the transducer 35. The bias roll 45 is mounted for rotation about a horizontal shaft 47, the opposite ends of which are secured to spaced ears 48 and 49 of a pivotal bracket 50, which bracket is in turn mounted for rotation about a horizontal axis on a shaft 51 secured at its opposite ends to side walls 12 and 14. A spring 52, the lower end of which is fixed to a bracket 53 secured to side wall 12, is at its upper end fixed to the bias roll bracket 50. Since the spring 52 is in tension, the bracket 50 is resiliently urged in a counterclockwise direction as viewed in FIG. 4 about its horizontal mounting shaft 51, in turn urging the bias roll 45 upwardly toward the convex surface 36 of the transducer 35. With the roll 35 biased in the manner indicated, when a card 6 is inserted into the reader, the roll 45 which engages the bottom surface of the inserted card functions to urge the card upwardly and the magnetic stripe M on the upper surface thereof against the convex surface 36 of the transducer head 35.

A driven rubber-surfaced roll 55 and an idler rubber-surfaced roll 56 are mounted in side-by-side relation between the transducer 35 and the guide block 32. Driven roll 55 is keyed to a horizontal shaft 57 journaled in bearings 58 and 59 fixed to sides 14 and 12 of the frame. Keyed to the shaft 57 exteriorly of the side wall 14 is a gear 60 which is driven by a gear 61 keyed to the shaft of a motor 62 fixed to the side wall 14. The motor 62 operates in a manner such that the drive roll 55 is driven in a clockwise direction as viewed in FIG. 6 to expel an inserted card from the reader, thereby returning the card to the user. The idler roll 56 is keyed to the shaft 51 which at its opposite ends is journaled in bearings 65 and 66 secured to side walls 12 and 14. As seen best in FIG. 6, the rolls 55 and 56 are mounted symmetrically with respect to the transducer 35, with the upper surface of the drive roll 55 contacting an inserted card 6 rightwardly of the transducer and the idler roll 56 contacting an inserted card leftwardly of the transducer. The bias roll 45 contacts the inserted card 6 at a point midway between the points at which rolls 55 and 56 contact the card. It should be understood that while bias roll 45 contacts the card midway between the points at which rolls 55 and 56 contact the card when viewed in FIG. 6, the bias roll 45 is actually located between the rolls 55 and 56 and the side wall 12 as seen in FIG. 3. Accordingly, the point at which bias roll 45 contacts an inserted card is laterally displaced with respect to the points of contact between the inserted card and rolls 55 and 56.

A bias roll 70 mounted for rotation about a horizontal axis by a bracket 71 is provided to urge an inserted card 6 into contact with the upper surface of the drive roll 55. The bias roll bracket 71 is mounted to the front of the reader via a leaf-spring 72. Bias roll 70 insures that there will be the necessary friction drive engagement between the lower surface of an inserted card and the rubber drive roll 55 to facilitate return of an inserted card when motor 62 is energized. The bias roll 70 also assists bias roll 45 in obtaining good physical contact between the magnetic stripe M of an inserted card 6 and the convex surface 36 of transducer 35. As viewed in FIGS. 4 and 6, the bias roll 70 is located slightly to the right of roll 55. So located, roll 70 bows an inserted card, urging the magnetic stripe M in the region of the transducer 35 upwardly against transducer surface 36.

Microswitches 80 and 81 mounted to a bracket 83 secured between front and rear members 20 and 16 are provided to facilitate control of the card reading and/or writing function and termination of driving action of roll 55 as a card is being returned to the user. Switches 80 and 81 have movable depending actuating arms 80A and 81A disposed in the path of a card 6 properly inserted into the reader. Upon initiation of the return of a card by clockwise motion of drive roll 55, the inserted card begins returning from the reader. When the switch arm 80A drops to its lower position shown in FIG. 2 upon passage of the edge 6A of the card from a position in which the actuating arm 80A rides upon the top of the card to a position wherein the arm 80A leaves the card, a signal is generated for initiating reading and/or writing of the card by the transducer 35. Card reading and/or writing continues until the edge 6A of the card passes the switch arm 81A, whereupon this switch arm drops to its lower position to generate a signal for terminating the card reading and/or writing operation, and for terminating drive motion of the roll 55. At this point, the powered return motion of the card from the reader, as well as reading and/or writing, stops and the card is manually removed by the user.

Initiation of clockwise motion of drive roll 55 to return a card to the user is controlled by a source of external control signals (not shown). For example, if the card reader is used in connection with a gate having a door whose lock is controlled by insertion of an appropriately encoded card into the reader, the signal for controlling the motor 62 and, hence, the drive action 55 of the driven roll 55 for returning the card to the user, can be obtained by detecting the coincidence of upward movement of switch actuators 80A and 81A upon insertion of a card into the reader.

The reader of this invention is characterized by reliability, yet marked ruggedness and simplicity in structure and operation. For example, only a single driven roller is required to effect reading of the card, reducing the drive requirements of the reader. In addition to the single driven roll for returning the card, a minimum number of auxiliary rolls are required. One auxiliary bias roll urges the card against the drive roll, a second auxiliary bias roll urges the magnetic stripe against the transducer, and a third auxiliary idler roll provides, in combination with the driven roll, symmetrical support for the card in the region of the transducer. Further, by locating the drive and idle rolls laterally of the transducer, the rolls can be placed closely together to provide a substantial degree of support for that portion of the card adjacent thereto lying beneath the transducer head. Finally, the mounting assembly for the transducing head, particularly the mounting plate with its three triangularly arranged adjusting screws and jam screw, provide an extremely simple, yet highly effective and convenient assembly for angularly adjusting the transducer in a number of different pivotal and rectilinear directions.

If the reader/writer apparatus 10 is to be utilized to write encoded information on a card 6, and thereafter read the same encoded information, the switch 80 is located, during the writing operation, such that the actuator 80A is forward of the position it occupies during reading, that is, is closer to the transducer 35 during the writing process than it is during the reading process. Since initiation of writing and/or reading occurs as a consequence of switch actuator 80A dropping off the edge 6A of an inserted card as the card is being expelled by the drive roll 55, by moving switch actuator 80A closer to the transducer 35 during writing, when the card is thereafter read, the initiation of reading will begin, with respect to the expulsion or return movement of the card, earlier than initiation of the writing. This insures that all information written on the card by the transducer 35 of reader/writer apparatus 10 will, when the same information is read from the card by the transducer 35 of reader/writer apparatus 10, be transduced, with none of the data recorded on the card being missed by delayed activation of the transducer 35 at the beginning of the reading cycle.

Having described our invention, we claim:

1. A reader and/or writer apparatus for transducing data encoded on a magnetic stripe formed on one surface of a card in a direction parallel to a pair of opposite side edges thereof, said reader comprising:

a housing including a frame and a card insertion opening, spaced guide members mounted to said frame for slidably receiving said opposite side edges of a card inserted in said reader through said opening, a transducer mounted to said frame proximate said one surface of an inserted card and in alignment with the magnetic stripe thereof, a driven first roll and a nondriven second roll mounted to said frame for rotation about axes which are generally parallel to each other and to said inserted card surfaces and generally perpendicular to the direction of the magnetic stripe of said inserted card, said rolls being positioned to contact the surface of said card opposite said one surface having said magnetic stripe along imaginary lines generally perpendicular to said stripe thereby locating said rolls and said transducer adjacent opposite sides of an inserted card, said roll axes being spaced from said transducer on opposite sides thereof measured in a direction parallel to said stripe of an inserted card, with the axis of said first roll between said card insertion opening and said transducer, said first and second roll providing substantial support for said card in proximity to said transducer, a motor drivingly connected to only said first roll for expelling an inserted card from said apparatus, and a nondriven bias roll mounted to said frame for contacting said one surface of an inserted card at a point between said card insertion opening and the point where said first roller contacts said inserted card for bowing said magnetic stripe toward said transducer to enhance transducing of data and for urging said card against said first roll to enhance card expulsion.

* * * * *